(12) United States Patent
Mikawa

(10) Patent No.: US 10,277,795 B2
(45) Date of Patent: Apr. 30, 2019

(54) IMAGE PICKUP APPARATUS FOR TAKING STATIC IMAGE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Chiaki Mikawa, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 32 days.

(21) Appl. No.: 15/134,604

(22) Filed: Apr. 21, 2016

(65) Prior Publication Data

US 2016/0316134 A1 Oct. 27, 2016

(30) Foreign Application Priority Data

Apr. 22, 2015 (JP) ................ 2015-087662

(51) Int. Cl.
*H04N 5/232* (2006.01)
(52) U.S. Cl.
CPC ..... *H04N 5/23212* (2013.01); *H04N 5/23293* (2013.01)
(58) Field of Classification Search
CPC .............. H04N 5/23212; H04N 5/23293
(Continued)

(56) References Cited

U.S. PATENT DOCUMENTS

2009/0268080 A1* 10/2009 Song ................ H04N 5/23212
348/349
2011/0273471 A1* 11/2011 Nagasaka .......... H04N 5/23212
345/619
(Continued)

FOREIGN PATENT DOCUMENTS

| JP | 2004-333924 A | 11/2004 |
|----|---------------|---------|
| JP | 2010-166519 A | 7/2010 |
| JP | 2012-230258 A | 11/2012 |
| JP | 2013-110551 A | 6/2013 |
| JP | 2013-201752 A | 10/2013 |

(Continued)

OTHER PUBLICATIONS

The above foreign patent documents were cited in the Dec. 11, 2018 Japanese Office Action, which is enclosed without an English Translation, that issued in Japanese Patent Application No. 2015087662.

*Primary Examiner* — Lin Ye
*Assistant Examiner* — Chan T Nguyen
(74) *Attorney, Agent, or Firm* — Cowan, Liebowitz & Latman, P.C.

(57) ABSTRACT

An image pickup apparatus that is capable of obtaining a high-quality image that is focused on an object designated by a user at the time of reproducing an image. A detection unit detects an object from an image obtained by photographing. A first computation unit computes a distance between the object and the image pickup apparatus as an object distance based on a distance map obtained according to the image. A decision unit decides a focus interval that is an interval of in-focus positions at which objects are focused and a focus frequency that is a count of the in-focus positions according to the object distance and a preset condition. A second computation unit computes the in-focus positions according to the object distance, the focus interval, and the focus frequency. A photographing unit obtains a plurality of images by photographing continuously at the in-focus positions by performing focus bracket photography.

14 Claims, 14 Drawing Sheets

(58) Field of Classification Search
USPC .......................................................... 348/355
See application file for complete search history.

(56) References Cited

U.S. PATENT DOCUMENTS

| | | | | |
|---|---|---|---|---|
| 2014/0176786 A1* | 6/2014 | Iwasaki | .............. | H04N 5/23212 348/351 |
| 2014/0192216 A1* | 7/2014 | Matsumoto | ........ | H04N 5/23212 348/222.1 |
| 2014/0253760 A1* | 9/2014 | Watanabe | .............. | H04N 5/142 348/239 |

FOREIGN PATENT DOCUMENTS

| JP | 2013-239119 A | 11/2013 |
|---|---|---|
| JP | 2014-126612 A | 7/2014 |
| JP | 2014-207502 A | 10/2014 |

\* cited by examiner

| OBJECT No. (401) | DISTANCE (402) | DEPTH (403) | |
|---|---|---|---|
| 1 | 18 | 15 | BOX |
| 2 | 20 | 18 | BOOK |
| 3 | 30 | 50 | CHILD |
| 4 | 320 | 15 | MOTHER |

*FIG. 7*

| FOCUS No. | FOCAL PLANE DISTANCE |
|---|---|
| 1 | 18 |
| 2 | 20 |
| 3 | 22 |
| 4 | 24 |
| 5 | 26 |
| 6 | 28 |
| 7 | 30 |
| 8 | 32 |
| 9 | 40 |
| 10 | 50 |
| 11 | 60 |
| 12 | 70 |
| 13 | 80 |
| 14 | 320 |

| OBJECT No. 401 | DISTANCE 402 | DEPTH 403 | PERSON OR ANIMAL 1404 | UNEVEN-NESS 1405 | |
|---|---|---|---|---|---|
| 1 | 18 | 15 | FALSE | UNEVEN | BOX |
| 2 | 20 | 18 | FALSE | FLAT | BOOK |
| 3 | 30 | 50 | TRUE | UNEVEN | CHILD |
| 4 | 320 | 15 | TRUE | FLAT | MOTHER |

FIG. 17

| 1601 OBJECT CHARACTERISTIC | 1602 OBJECT DISTANCE | 1603 OBJECT-CHARACTERISTIC-FOCUS-INTERVAL COEFFICIENT | 1604 OBJECT-DISTANCE-FOCUS-INTERVAL COEFFICIENT | 1605 OBJECT-CHARACTERISTIC-FOCUS-FREQUENCY COEFFICIENT | 1606 OBJECT-DISTANCE-FOCUS-FREQUENCY COEFFICIENT | 1607 FOCUS INTERVAL | 1608 FOCUS FREQUENCY |
|---|---|---|---|---|---|---|---|
| PERSON/ANIMAL | UNDER 20cm | 0.25 | 0.2 | 4 | 4 | 1 | 16 |
| PERSON/ANIMAL | UNDER 300cm | 0.25 | 1 | 4 | 2 | 5 | 8 |
| PERSON/ANIMAL | OVER 300cm | 0.25 | 4 | 4 | 1 | 20 | 4 |
| UNEVENNESS | UNDER 20cm | 0.5 | 0.2 | 2 | 4 | 2 | 8 |
| UNEVENNESS | UNDER 300cm | 0.5 | 1 | 2 | 2 | 10 | 4 |
| UNEVENNESS | OVER 300cm | 0.5 | 4 | 2 | 1 | 40 | 2 |
| NORMAL | UNDER 20cm | 1 | 0.2 | 1 | 4 | 4 | 4 |
| NORMAL | UNDER 300cm | 1 | 1 | 1 | 2 | 20 | 2 |
| NORMAL | OVER 300cm | 1 | 4 | 1 | 1 | 80 | 1 |

IMAGE PICKUP APPARATUS FOR TAKING STATIC IMAGE, CONTROL METHOD THEREFOR, AND STORAGE MEDIUM STORING CONTROL PROGRAM THEREFOR

BACKGROUND OF THE INVENTION

Field of the Invention

The present invention relates to an image pickup apparatus, a control method therefor, and a storage medium storing a control program therefor, and in particular, relates to an image forming apparatus that picks up a static image.

Description of the Related Art

There is a known image pickup apparatus that generates an image focused on an object (a person or another object) at a desired distance in a photographed scene at the time of reproducing the image (see Japanese Laid-Open Patent Publication (Kokai) No. 2013-201752 (JP 2013-201752A)).

Furthermore, there is a known image pickup apparatus that calculates an object distance on the basis of a plurality of images of which blurs are different in order to prevent deterioration of image quality due to a blur addition process (see Japanese Laid-Open Patent Publication (Kokai) No. 2013-239119 (JP 2013-239119A)). This image pickup apparatus changes the object distance according to a reliability of an object distance that is found for every area within an image according to the misalignment between a plurality of images.

However, the image pickup apparatus disclosed in JP 2013-201752A has a problem in that the quality of the image generated according to the object distance designated by a user is inferior to the quality of the image picked up at the focused object distance.

Moreover, the image pickup apparatus disclosed in JP 2013-239119A is difficult to obtain an image focused on the object designated by a user at the time of reproducing. On the other hand, if what is called focus bracket photography was performed for all the focusable distances, there would be extremely much futility.

SUMMARY OF THE INVENTION

The present invention provides an image pickup apparatus, a control method therefor, and a storage medium storing a control program therefor, which are capable of obtaining a high-quality image that is focused on an object designated by a user at the time of reproducing an image.

Accordingly, a first aspect of the present invention provides an image pickup apparatus including a detection unit configured to detect an object from an image obtained by photographing using an image pickup optical system, a first computation unit configured to compute a distance between the object and the image pickup apparatus as an object distance based on a distance map obtained according to the image, a decision unit configured to decide a focus interval that is an interval of in-focus positions at which the object is focused and a focus frequency that is a count of the in-focus positions according to the object distance and a preset condition, a second computation unit configured to compute the in-focus positions according to the object distance, the focus interval, and the focus frequency, and a photographing unit configured to obtain a plurality of images by photographing continuously at the in-focus positions by performing focus bracket photography.

Accordingly, a second aspect of the present invention provides a control method for an image pickup apparatus including a detection step of detecting an object from an image obtained by photographing using an image pickup optical system, a first computation step of computing a distance between the object and the image pickup apparatus as an object distance based on a distance map obtained according to the image, a decision step of deciding a focus interval that is an interval of in-focus positions at which the object is focused and a focus frequency that is a count of the in-focus positions according to the object distance and a preset condition, a second computation step of computing the in-focus positions according to the object distance, the focus interval, and the focus frequency, and a photographing step of obtaining a plurality of images by photographing continuously at the in-focus positions by performing focus bracket photography.

Accordingly, a third aspect of the present invention provides a non-transitory computer-readable storage medium storing a control program causing a computer to execute the control method of the second aspect.

According to the present invention, since the focus interval and the focus frequency are determined according to the object distance and the preset condition, a high-quality image that is focused on an object designated by a user is obtained at the time of reproducing an image by performing necessary minimum focus bracket photography.

Further features of the present invention will become apparent from the following description of exemplary embodiments with reference to the attached drawings.

BRIEF DESCRIPTION OF THE DRAWINGS

FIG. 7 is a view showing an example of focal plane distance data obtained as a result of the focal plane distance detection process.

FIG. 17 is a view showing an example of a result of the focus-interval-and-focus-frequency calculation process performed with the camera according to the second embodiment of the present invention.

DESCRIPTION OF THE EMBODIMENTS

Hereafter, embodiments according to the present invention will be described in detail with reference to the drawings.

Figure 1:
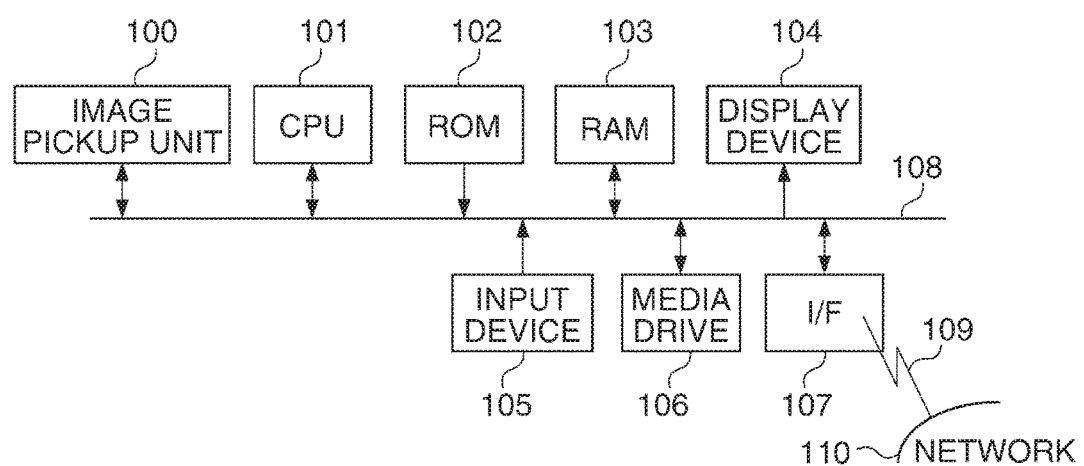
FIG. 1 is a block diagram schematically showing a configuration of an image pickup apparatus according to a first embodiment of the present invention.

FIG. 1 is a block diagram schematically showing a configuration of an image pickup apparatus according to a first embodiment of the present invention.

The illustrated image pickup apparatus is a digital still camera (hereinafter referred to as a camera, simply) that has an image pickup unit 100. The image pickup unit 100 is provided with an image pickup device like a CCD or a CMOS sensor and an A/D convertor (both of them are not shown). The image pickup device outputs an electrical signal (analog signal) corresponding to an optical image formed through an image pickup optical system. Then, the A/D convertor applies an A/D conversion and a predetermined signal process to the analog signal, and outputs it as image data.

A CPU 101 controls the whole camera. A ROM 102 stores operation process procedures (programs for a process at the time when the power of the camera turns on, a basic input/output process, etc.) of the CPU 101. A RAM 103 is used as a main memory of the CPU 101. Furthermore, various programs including control programs for performing processes mentioned later are loaded to the RAM 103 from the ROM 102 etc., and are executed by the CPU 101. The RAE 103 is used as a work area at the time of execution of various processes by the CPU 101.

The CPU 101 displays variety of information according to a process on a display device 104. For example, the CPU 101 displays image data etc. that is stored in a storage medium on the display device 104. An input device 105 has buttons etc. A user gives various instructions to the camera by operating the input device 105. It should be noted that input device 105 includes a power switch, a release button, etc.

A storage-medium equipping unit (media drive) 106 is equipped with a storage medium. The CPU 101 stores image data etc. into the storage medium concerned, and reads image data etc. stored in the storage medium. A network interface (I/F) 107 is connected with a computer network 110 via a communication line 109. The CPU 101 transmits and receives image data etc. to and from a server computer or a personal computer on the computer network 110 through the network interface 107.

The above-mentioned blocks (units) are mutually connected through system buses (an address bus, a data bus, and a control bus).

Figure 2:
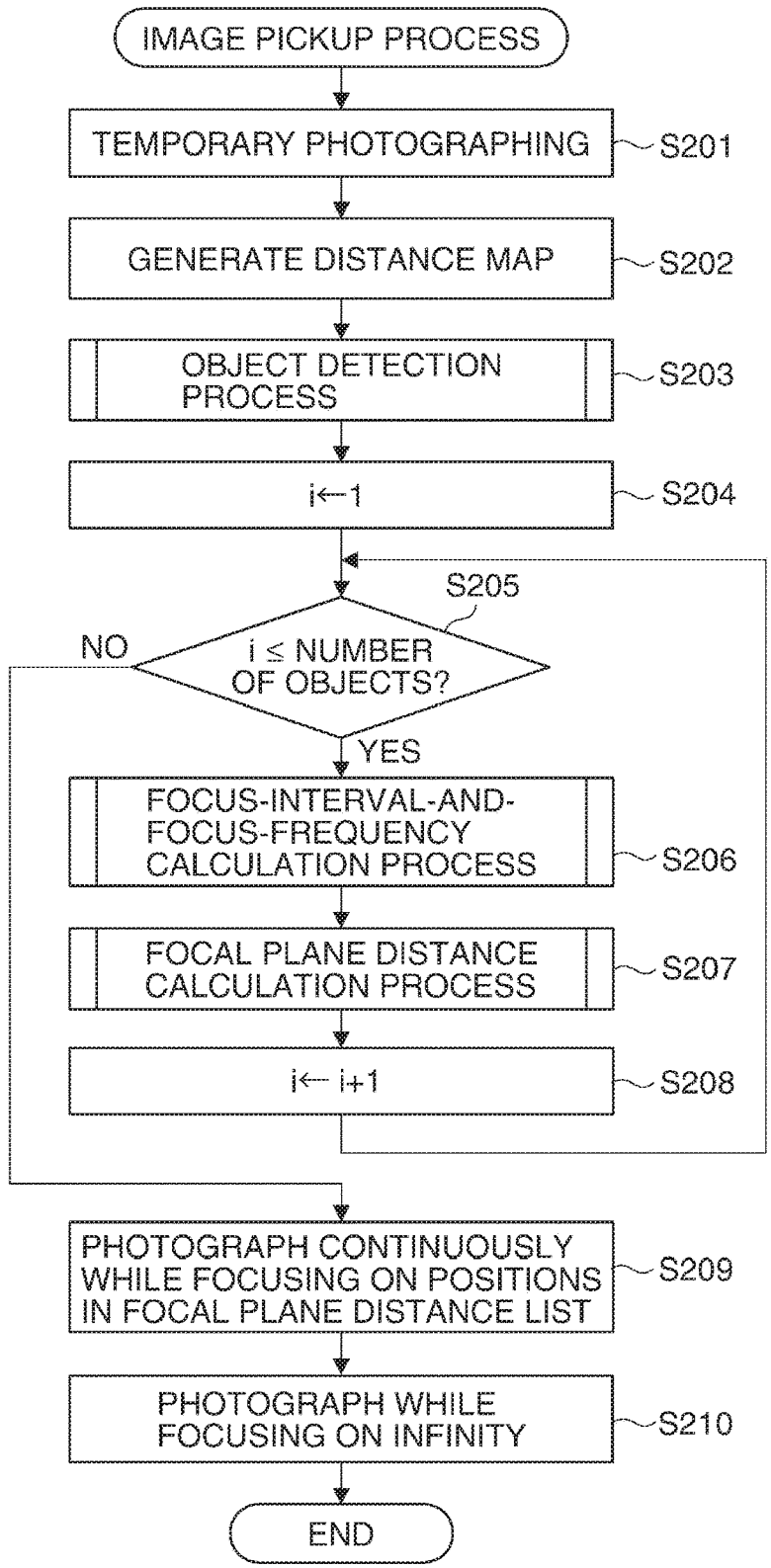
FIG. 2 is a flowchart showing an image pickup process executed by the camera shown in FIG. 1.

FIG. 2 is a flowchart showing an image pickup process executed by the camera shown in FIG. 1. The process in the flowchart in FIG. 2 is performed when the CPU 101 executes the control program developed onto the RAM 103.

When a user presses the release button of the input device 105, the CPU 101 determines that there is a photographing operation by the user, and starts the image pickup process. It should be noted that a unit for an object distance and a depth is centimeter in the description below.

When the image pickup process is started, the CPU 101 controls the image pickup unit 100 to perform temporary photographing (step S201). Then, the CPU 101 records image data obtained as a result of the temporary photographing into the RAM 103.

Subsequently, the CPU 101 generates a distance map according to the image data obtained in the step S201 (step S202). It should be noted that the distance map is data that is obtained by digitalizing an object distance between the camera and the object for each pixel that specifies an object image. The method disclosed in JP 2013-2019A mentioned above is used for generating the distance map, for example. Then, the CPU 101 records the distance map concerned into the RAM 103.

Subsequently, the CPU 101 detects an object distance for each object by detecting the object with reference to the distance map generated in the step S202 (step S203). The method for detecting an object will be described later with reference to FIG. 3.

Next, the CPU 101 sets a count value i of a built-in counter to "1" (step S204). Then, the CPU 101 determines whether the count value i is equal to or less than the number of the objects (for example, a person and another object) in the image data (step S205). The number of objects will be set as a count value objCount in the process shown in FIG. 3.

When the count value us equal to or less than the number of objects (YES in the step S205), the CPU 101 finds an interval and a frequency of in-focus positions on the basis of the object distance obtained in the step S203 (step S206). In the following description, the interval of the in-focus positions is referred to as a focus interval and the frequency of photographing at the in-focus positions is referred to as a focus frequency. The calculations of the focus interval and the focus frequency will be mentioned later.

Next, the CPU 101 computes a physical distance (hereinafter referred to as a focal plane distance) from the image pickup device to the in-focus position on the basis of the object distance, the focus interval, and the focus frequency, and stores it as a focal plane distance list to the RAM 103 (step S207). The calculation of the focal plane distance and the focal plane distance list will be mentioned later. Then, the CPU 101 increments the count value i by "+1" (step S208), and returns the process to the step S205.

When the count value i exceeds the number of objects (NO in the step S205), the CPU 101 reads the focal plane distance list from the RAM 103, and controls the image pickup unit 100 to drive a focusing lens of the image pickup optical system so as to be focused on the objects at the distances recorded in the focal plane distance list and to photograph continuously (step S209). Then, the CPU 101 records the plurality of image data obtained as the results of the continuous photographing into the storage medium as a group of images obtained in response to one photographing operation in association with the distance map with the media drive 106. It should be noted that each of the image data that constitutes the image group has individual header information, which includes focal-plane-distance information that shows the focal plane distance.

Subsequently, the CPU 101 controls the image pickup unit 100 to photograph while focusing on infinity. Then, the CPU 101 records the image data obtained by focusing on infinity to the storage medium with the media drive 106 as one of the image groups obtained in the step S209 (step S210). Then, the CPU 101 finishes the image pickup process.

Figure 3:
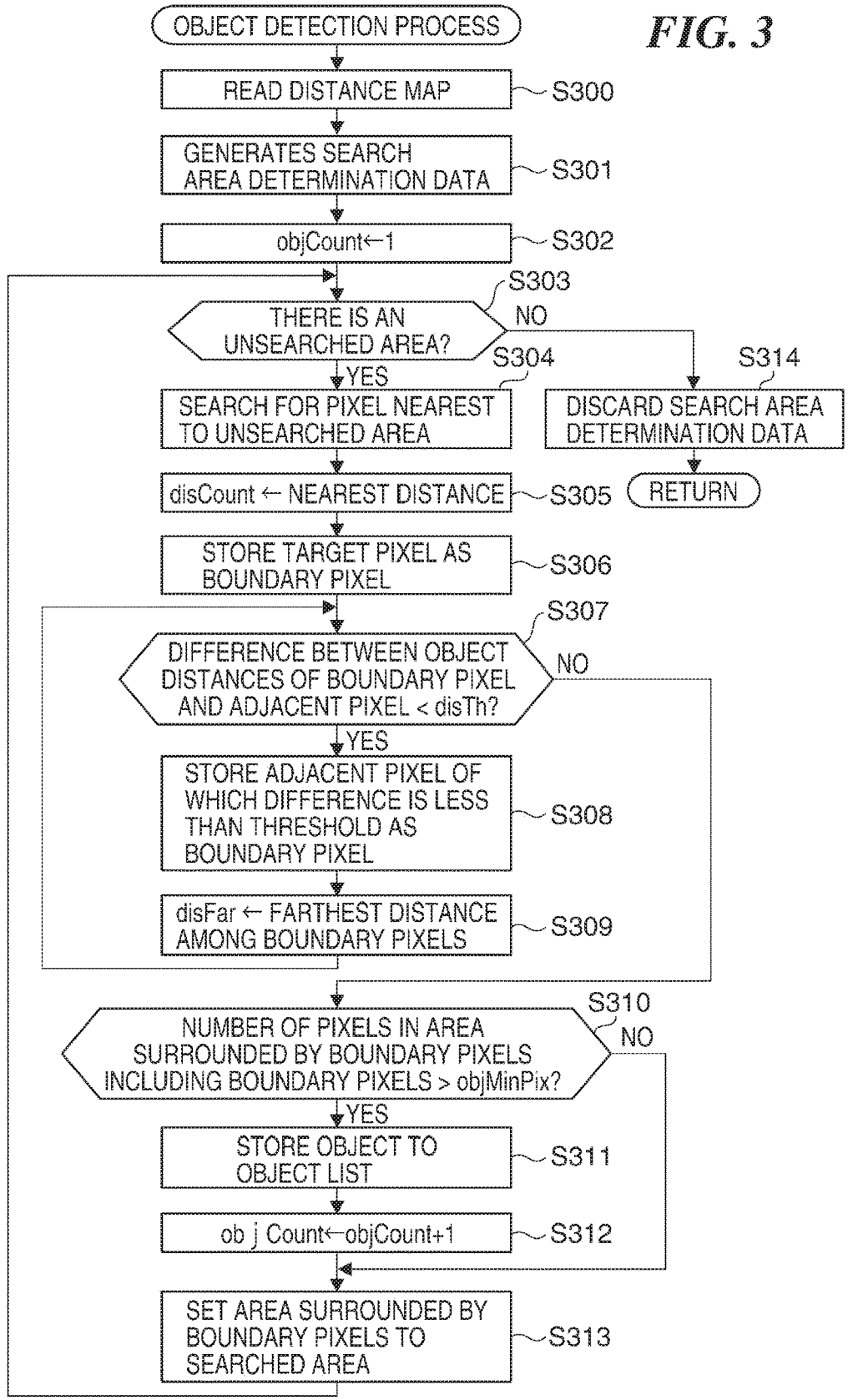
FIG. 3 is a flowchart showing an object detection process shown in FIG. 2.
Figures 4, 5:
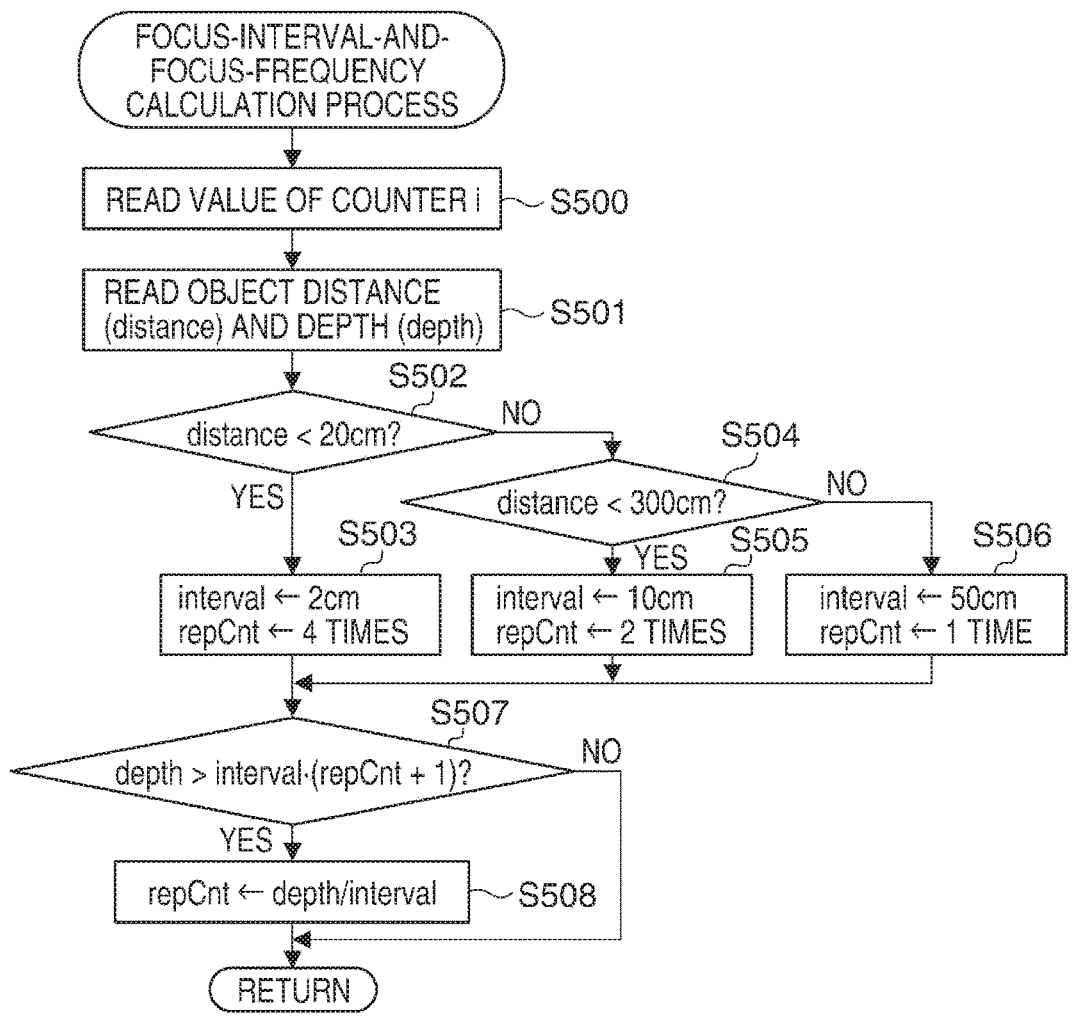
FIG. 4 is a view showing an example of an object list that shows an object detection result obtained as a result of the object detection process.
FIG. 5 is a flowchart showing a focus-interval-and-focus-frequency calculation process shown in FIG. 2.

FIG. 3 is a flowchart showing an object detection process shown in FIG. 2. FIG. 4 is a view showing an example of an object list that shows an object detection result obtained as a result of the object detection process.

As shown in FIG. 3 and FIG. 4, when the object detection process is started, the CPU 101 reads the distance map from the RAM 103 (step S300). Then, the CPU 101 generates search area determination data that has the same pixel count as the distance map, and records at to the RAM 103 (step S301). This search area determination data is used to determine whether the object detection process is completed for the whole distance map in the process after the below-mentioned step S303. It should be noted that the pixel values of all the pixels of the search area determination data are set to "0", which means that all the areas are unsearched, immediately after generating the data.

Subsequently, the CPU 101 sets the count value objCount of a counter for counting the number of objects to "1" (step S302). Then, the CPU 101 determines whether there is an unsearched area with reference to the search area determination data stored in the RAM 103 (step S303). When determining whether there is an unsearched area, the CPU 101 determines whether an unsearched area exists by determining whether the pixel of which the pixel value is "0" exists with reference to each pixel of the search area determination data.

When there is no unsearched area (NO in the step S303), the CPU 101 determines that the object detection process is completed and discards the search area determination data stored in the RAM 103 (step S314). Then, the CPU 101 finishes the object detection process.

On the other hand, when there is an unsearched area (YES in the step S303), the CPU 101 obtains a coordinate of an unsearched area (i.e., a pixel of which pixel value is "0") with reference to the search area determination data stored in the RAM 103. Then, the CPU 101 searches for a pixel that is nearest to the unsearched area with reference to the pixel value of the distance map corresponding to the coordinate concerned (step S304).

Next, the CPU 101 sets a variable disClose to the distance searched in the step S304, i.e., the nearest distance (step S305). Then, the CPU 101 stores the pixel searched in the step S304 (i.e., a target pixel) into the RAM 103 as a boundary pixel in order to determine a boundary at the time of detecting an object (step S306).

Subsequently, the CPU 101 determines whether the difference between the object distance of the boundary pixel and an object distance of an adjacent pixel is less than a predetermined threshold disTh for all pixels adjacent to the boundary pixel concerned (step S307). It should be noted that the threshold disTh shall be 1 cm, for example. When there is an adjacent pixel of which the difference of the object distances is less than the threshold disTh (YES in the step S307), the CPU 101 stores the adjacent pixel concerned into the RAM 103 as a boundary pixel (step S308).

Subsequently, the CPU 101 sets the distance between the pixel nearest to the unsearched area and the pixel furthest from the unsearched area within the area surrounded by the boundary pixels including the boundary pixels to a variable disFar with reference to the distance map (step S309). Then, the CPU 101 returns the process to the step S307.

When there is no pixel of which the difference of the object distances is less than the threshold disTh (NC in the step S307), the CPU 101 determines whether the number of pixels within the area surrounded by the boundary pixels including the boundary pixels is larger than a predetermined threshold objMinPix (step S310). When the number of pixels is more than the threshold objMinPix (YES in the step S310), the CPU 101 determines that the target object occupies sufficient area and accepts that the area surrounded by the boundary pixels including the boundary pixels is one object. Then, the CPU 101 stores the object concerned, to the object list shown in FIG. 4 (step S311). It should be noted the object list is stored into the RAM 103.

Next, the CPU 101 increments the count value objCount of the object counter by "+1" (step S312). Then, the CPU 101 sets the pixel value of every pixel within the area surrounded by the boundary pixels including the boundary pixels in the search area determination data stored in the RAM 103 to "1" (step S313), which means that the area has been searched. Then, the CPU 300 returns the process to the step S303.

When the number of pixels is equal to or less than the threshold objMinPix (NO in the step S310), the CPU 101 determines that the target object does not occupy sufficient area as an independent object, and proceeds with the process to the step S313 without executing the process an the steps S311 and S312. It should be noted that the threshold objMinPix is set to ½₀ of the number of pixels that constitute the distance map, for example.

The object list shown in FIG. 4 contains an object number column 401, a distance column 402, and a depth column 403, and "beetle", "book", "child", and "mother" are listed as examples of objects. The object number is an identification number for uniquely identifying an object to be observed. The count value objCount is entered into the object number column 401.

The distance shows the distance of the object to be observed. The variable disClose is entered into the distance column 402. The depth shows the depth of the object to be observed. The result that is obtained by subtracting the nearest distance disClose from the furthest distance disFar is entered into the depth column 403.

FIG. 5 is a flowchart showing a focus-interval-and-focus-frequency calculation process shown in FIG. 2.

When the focus-interval-and-focus-frequency calculation process is started, the CPU 101 reads the count value of the above-mentioned counter i (step S500). Then, the CPU 101 reads the object distance (distance) and the depth (depth) about the i-th object from the object list stored in the RAM 103 (step S501).

Subsequently, the CPU 101 determines whether the object distance (distance) is less than a predetermined first distance threshold (for example, 20 cm) (step S502). When distance<20 cm (YES in the step S502), the CPU 101 determines that the distance to the object is in an extremely short range, sets the focus interval (interval) to "2", and sets the focus frequency (i.e., photographing frequency) repCnt to "4" (step 3503).

On the other hand, when distance≥20 cm (NO in the step S502), the CPU 101 determines whether the object distance (distance) is less than a predetermined second distance threshold (for example, 300 cm) (step S504). When distance<300 cm (YES in the step S504), the CPU 101 determines that the distance to the object is in a middle distance range, sets the focus interval (interval) to "10", and sets is set the focus frequency repCnt to "2" (step S505).

When distance≥300 cm (NO in the step S504), the CPU 101 determines that the distance to the object is in a far distance range, sets the focus interval (interval) to "50", and sets the focus frequency repCnt to "1" (step S506).

After the step S503, S505, or S506, the CPU 101 determines whether a relationship shown by the following formula (1) becomes true or false (step S507).

$$\text{depth} > \text{interval} \cdot (\text{repCnt}+1) \quad (1)$$

When the relationship shown by the formula (1) is true, i.e., holds (YES in the step S507), the CPU 101 determines that the above-mentioned focus interval and focus frequency are short to obtain the necessary number of images for the depth of the target object, and calculates the focus frequency again according to a formula (step S508). Then, the CPU 101 finishes the focus-interval-and-focus-frequency calculation process.

$$\text{repCnt} = \text{depth}/\text{interval} \quad (2)$$

On the other hand, when the relationship shown by the formula (1) is false, i.e., does not hold (NO in the step S507), the CPU 101 determines that the above-mentioned focus interval and focus frequency are enough to obtain the necessary number of images for the depth of the target object, and finishes the focus-interval-and-focus-frequency calculation process.

Figure 6:
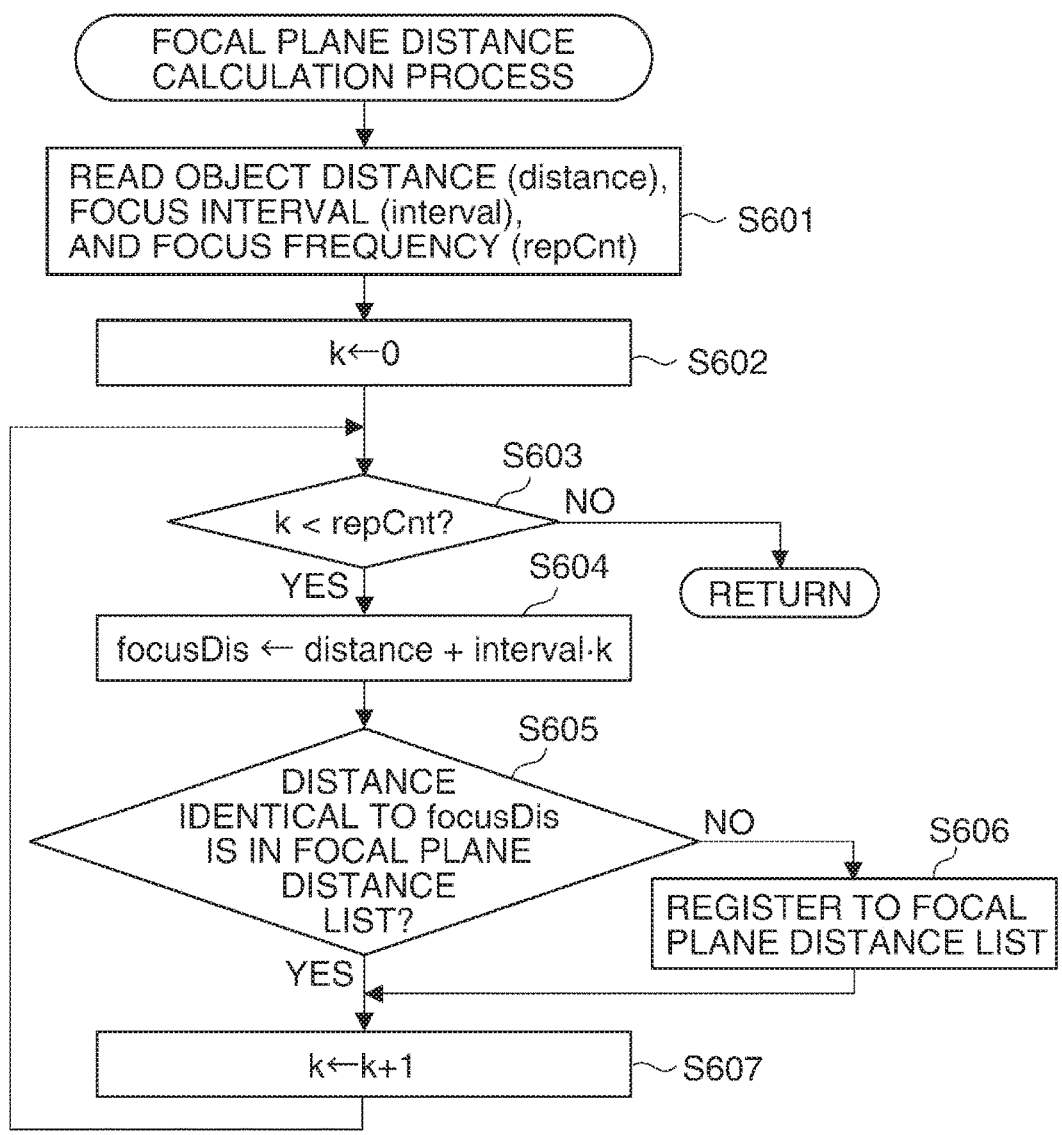
FIG. 6 is a flowchart showing a focal plane distance calculation process shown in FIG. 2.

FIG. 6 is a flowchart showing a focal plane distance calculation process shown in FIG. 2. Moreover, FIG. 7 is a view showing an example of focal plane distance data (a focal plane distance list) obtained as a result of the focal plane distance detection process.

As shown in FIG. 6 and FIG. 7, when the focal plane distance calculation process is started, the CPU 101 reads the focus interval (interval) and the focus frequency (repCnt) that are found by the process in the step S206 shown in FIG. 2 and the object distance (distance) concerning the i-th object from the RAM 103 (step S601). Then, the CPU 101 sets a process counter k to "0" (step S602).

Subsequently, the CPU 101 determines whether the count value of the process counter k is less than the focus frequency repCnt (step S603). When the count value of the process counter k is equal to or more than the focus frequency repCnt (NO in the step S603), the CPU 101 finishes the focal plane distance calculation process.

On the other hand, when the count value of the process counter k is less than the focus frequency repCnt (YES in the step S603), the CPU 101 computes the focal plane distance focusDis according to the following formula (3) (step S604).

$$\text{focusDis} = \text{distance} + \text{interval} \cdot k \quad (3)$$

Next, the CPU 101 determines whether there is the focal plane distance that is identical to the focal plane distance focusDis computed in the step S604 in the focal plane distance list stored in the RAM 103 (step S605). When there is no focal plane distance that is identical to the focal plane distance focusDis (NO in the step S605), the CPU 101 gives a focus number to the focal plane distance focusDis concerned and stores it to the focal plane distance list (step S606).

This focus number uniquely specifies the focal plane distance of the target object. The count value of the above-mentioned process counter k is entered into a focus number (focus No.) column 701 shown in FIG. 7. When determining the focus number, the CPU 101 increments the largest number among the focus numbers stored in the focal plane distance list, and is taken as the focus number. Moreover, the focal plane distance focusDis obtained by the process in the step S604 is stored in a focal plane distance column 702.

Next, the CPU 101 increments the count value of the process counter k by "+1" (step S607). Then, the CPU 101 returns the process to the step S307. When there is the focal plane distance that is identical to the focal plane distance focusDis (YES in the step S605), the CPU 101 proceeds with the process to the step S607.

Thus, the focal plane distances for the focus number 1 through the focus number 14 about the objects shown in FIG. 4 are stored into the focal plane distance list shown in FIG. 7.

Figure 8:
FIG. 8 is a view showing an example of a photographing scene picked up with the camera shown in FIG. 1.

FIG. 8 is a view showing an example of a photographing scene photographed with the camera shown in FIG. 1. Moreover, FIG. 9 is a view showing a relationship between an object position and an in-focus position in the photographing scene shown in FIG. 8.

The photographing scene shown in FIG. 8 shall be photographed with the camera shown in FIG. 1. As shown in FIG. 9, the distances to the box 901, the book 903, the child 904, and the mother 905 become longer in this order with respect to the camera 901. The object list shown in FIG. 4 shall be obtained after the above-mentioned object detection process. Then, the focal plane distance calculation process is performed for the object list concerned, and the focal plane distances of the focus number 1 through the focus number 14 shown in FIG. 7 are obtained.

Figure 9:
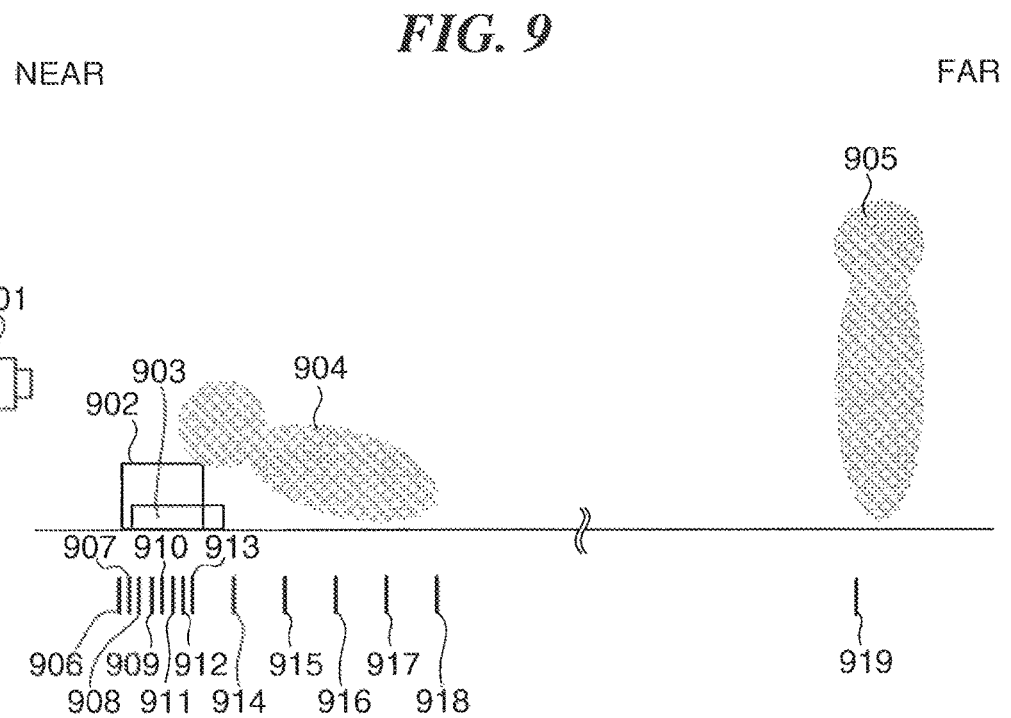
FIG. 9 is a view showing a relationship between an object position and an in-focus position in the photographing scene shown in FIG. 8.

Reference numerals 906 through 919 in FIG. 9 show in-focus positions, and correspond to the focal plane distances of the focus number 1 through the focus number 14 shown in FIG. 7. The in-focus positions 906 through 913 respectively correspond to the focal plane distances of the focus number 1 through the focus number 8. It is clear that the focus intervals in the near distance range from the camera 901 in which the box 902 and the book 903 are included are shorter.

The in-focus positions 914 through 918 respectively correspond to the focal plane distances of the focus number 9 through the focus number 13. It is clear that the focus intervals from the in-focus position 913 to the child 904 that are included in the middle distance range from the camera 901 are equal. The in-focus position 919 corresponds to the focal plane distance of the focus number 14. It is clear that the in-focus position 919 coincides with the position of the mother 905 who is located in a long distance range from the camera 901. Since there is no object in the range between the in-focus positions 918 and 919, there is no in-focus position in the range concerned.

Figure 10:
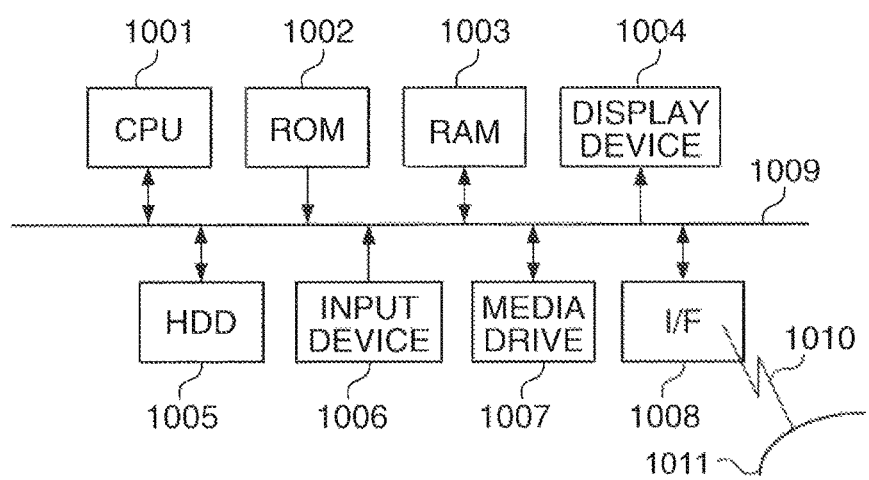
FIG. 10 is a block diagram showing a configuration of a personal computer (PC) that is an example of an image displaying apparatus for displaying an image obtained with the camera shown in FIG. 1.

FIG. 10 is a block diagram showing a configuration of a personal computer (PC) that is an example of an image displaying apparatus for displaying an image obtained with the camera shown in FIG. 1.

The illustrated PC has a CPU 1001 that controls the entire PC. A ROM 202 stores operation process procedures (programs for a startup process for the computer, and programs of a basic input/output process, etc.) of the CPU 1001. A RAM 1003 is used as a main memory of the CPU 1001.

Furthermore, various programs including control programs for performing processes mentioned later are loaded to the RAM 1003 from a hard disk drive (HDD) 1005 etc., and are executed by the CPU 1001. The RAM 1003 is used as a work area at the time of execution of various processes by the CPU 1001.

The HDD 1005 is used for saving an application program, data, a library, etc., and for reading. An input device 1006 has a pointing device, a keyboard, etc. A display unit 1004 displays various kinds of information under control of the CPU 1001.

A storage-medium equipping unit (a media drive) 1007 is detachably equipped with a storage medium. The image data obtained with the camera shown in FIG. 1 as a result of photographing, for example, is recorded into the storage medium concerned. Then, the media drive 1007 reads the image data stored in the storage medium under control of the CPU 1001.

A network interface (L/F) 1008 is connected with a computer network 1011 via a communication line 1010. The PC transmits and receives various data, such as image data, to and from an external device through the network interface 1008. It should be noted that the above-mentioned blocks are mutually connected through system buses (an address bus, a data bus, and a control bus).

In the following description, the image data of a processing target shall be already saved in the HDD 1005.

Figure 11:
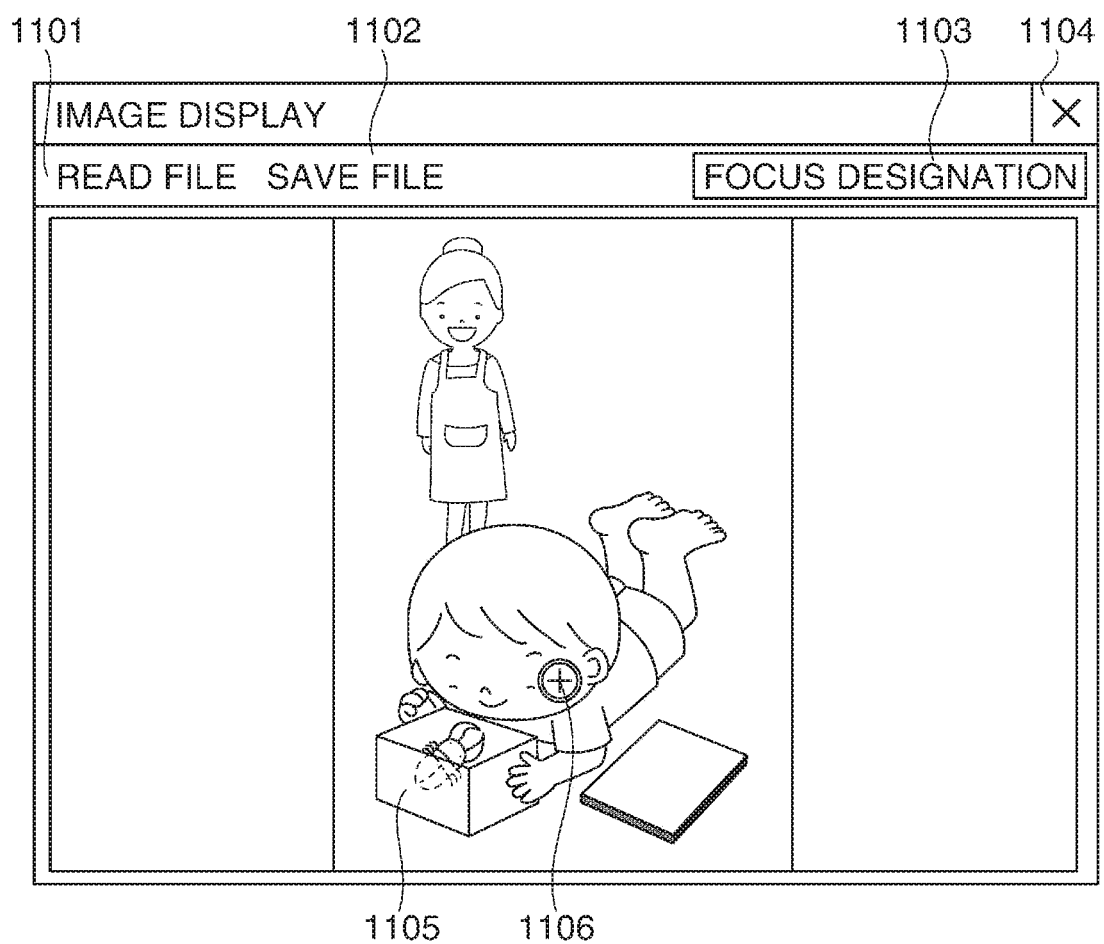
FIG. 11 is a view showing an example of a user interface used in the image displaying apparatus (PC) shown in FIG. 10.

FIG. 11 is a view showing an example of a user interface used in the image displaying apparatus (PC) shown in FIG. 10. Hereinafter, a method that a user changes an in-focus position at a time of reproducing an image will be described.

The user interface shown in FIG. 11 shall be displayed on the display unit 1004 of the PC. A file reading menu 1101 is displayed on the user interface illustrated. When a user selects the file reading menu 1101 using the input device 1006, the CPU 1001 determines that there is a file reading instruction, and displays a file open dialog on the display unit 1004. Then, when the user selects image data in the file open dialog, the CPU 1001 reads the selected image data from the HDD 1005 into the RAM 1003, and displays it in an image data displaying area 1105 as an image.

When the user selects a file save menu 1102 displayed on the user interface using the input device 1006, the CPU 1001 determine that there is a file saving instruction, and displays a file saving dialog on the display device 1004. Then, the CPU 1001 saves the image displayed in the image data displaying area 1105 into the HDD 1005 with a file name designated by the user.

When the user presses a focus designation button 1103 using the input device 1006, the CPU 1001 determines that there is a focus position specifying operation, and displays the focus designation button in a concave state. Then, the CPU 1001 changes a shape of a cursor 1106 that shows a position of the below-mentioned pointing device in the image data displaying area 1105. That is, the cursor 1106 exhibits a shape of an arrow immediately after starting the PC. When the user presses the focus designation button 1103, the CPU 1001 determines that there is a focus position specifying operation, and changes the shape of the cursor 1106.

Where the user presses the focus designation button 1103 again in the concave state, the CPU 1001 determines that the focus position specifying operation is released, and restores the focus designation button 1103 to a convex state. Furthermore, when a position is selected on the screen in the state where the focus designation button 1103 is in the concave state, the CPU 1001 determines that a focus position specification is completed, performs an image display process mentioned later, and restores the focus designation button 1103 to a convex state.

When the user presses an end button 1104 using the input device 1006, the CPU 1001 determines that there is a finishing instruction, and finishes displaying the image.

When the user changes the in-focus position in desired image data, the user selects the desired image data in the file reading menu first. After pressing the focus designation button 1103, the user moves the cursor to the position on which the user wants to focus in the image data displaying area 1105, and selects the position concerned (a focus position specifying operation).

As a result of this, the CPU 1001 performs the image display process mentioned later, and displays the image focused on the position selected by the user in the image data displaying area 1105.

Figure 12:
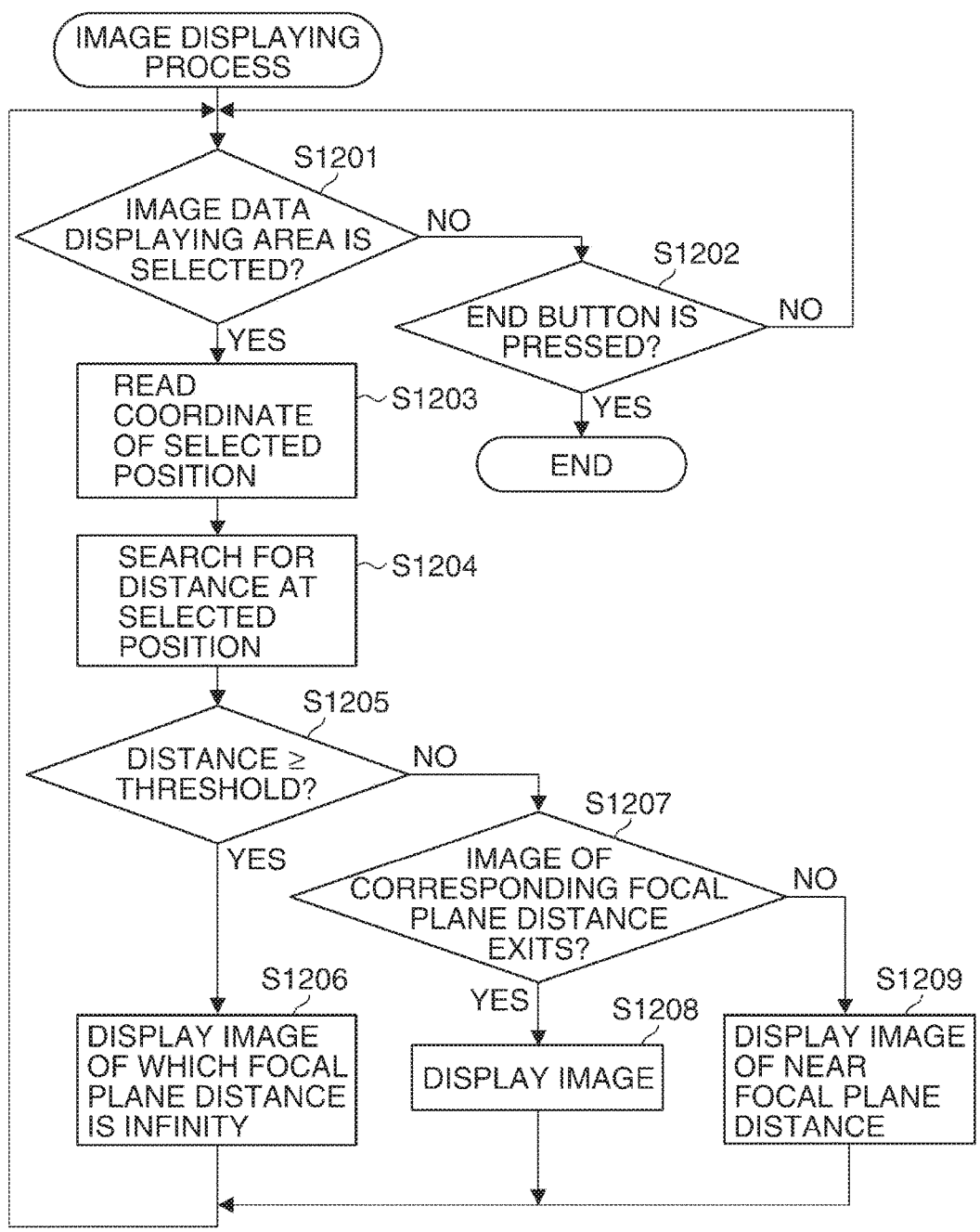
FIG. 12 is a flowchart showing an image displaying process performed by the PC shown in FIG. 11.

FIG. 12 is a flowchart showing the image displaying process performed by the PC shown an FIG. 10.

When there is a focus position specifying operation as mentioned above, the CPU 1001 starts the image display process. The CPU 1001 determines whether the user selects a position in the image data displaying area 1105 (step S1201). When determining that the position is not selected in the image data displaying area 1105, i.e., when determining that the position is selected outside the image data displaying area 1105 (NO in the step S1201), the CPU 1001 determines whether the user presses the end button 1104 (step S1202).

When determining that the user presses the end button 1104 (YES in the step S1202), the CPU 1001 finishes the image display process. On the other hand, when determining that the end button 1104 is not pressed (NO in the step S1202), the CPU 1001 returns the process to the step S1201.

When determining that the position is selected in the image data displaying area 1105 (YES in the step 31201), the CPU 1001 reads the coordinate of the position selected by the user (step S1203). Subsequently, the CPU 1001 reads the distance map associated with the displayed image data from the HDD 1005 into the RAN 1003, and searches the distance nap for the distance (the object distance) at the selected position coordinate (step S1204).

Next, the CPU 1001 determines whether the distance searched in the step S1204 is equal to or more than a preset threshold (step S1205). It should be noted that the threshold shall be 1000 cm, for example. When the distance is equal to or more than the threshold (YES in the step S1205), the CPU 1001 reads the image data of which the focal plane distance is infinity form the HDD 1005 into the RAM 1003, and displays it in the image data area 1105 (step S1206). Then, the CPU 1001 returns the process to the step S1201.

When the distance is less than the threshold (NO in the step S1205), the CPU 1001 determines whether the image data of which the focal plane distance coincides with the distance that is searched in the step S1204 exists in the HDD 1005 (step S1207). When the image data of the focal plane distance that coincides with the distance exists (YES in the step S1207), the CPU 1001 reads the image data of which the focal plane distance coincides with the distance mentioned above from the HDD 1005 into the RAM 1003, and displays it in the image data area 1105 (step S1208). Then, the CPU 1001 returns the process to the step S1201.

When there is no image data of which the focal plane distance coincides with the distance (NO in the step S1207), the CPU 1001 reads an image of which the focal plane distance is nearest to the distance searched in step S1204 is read into the RAM 1003, and displays it in the image data area 1105 (step S1209). Then, the CPU 1001 returns the process to the step S1201.

Figure 13:
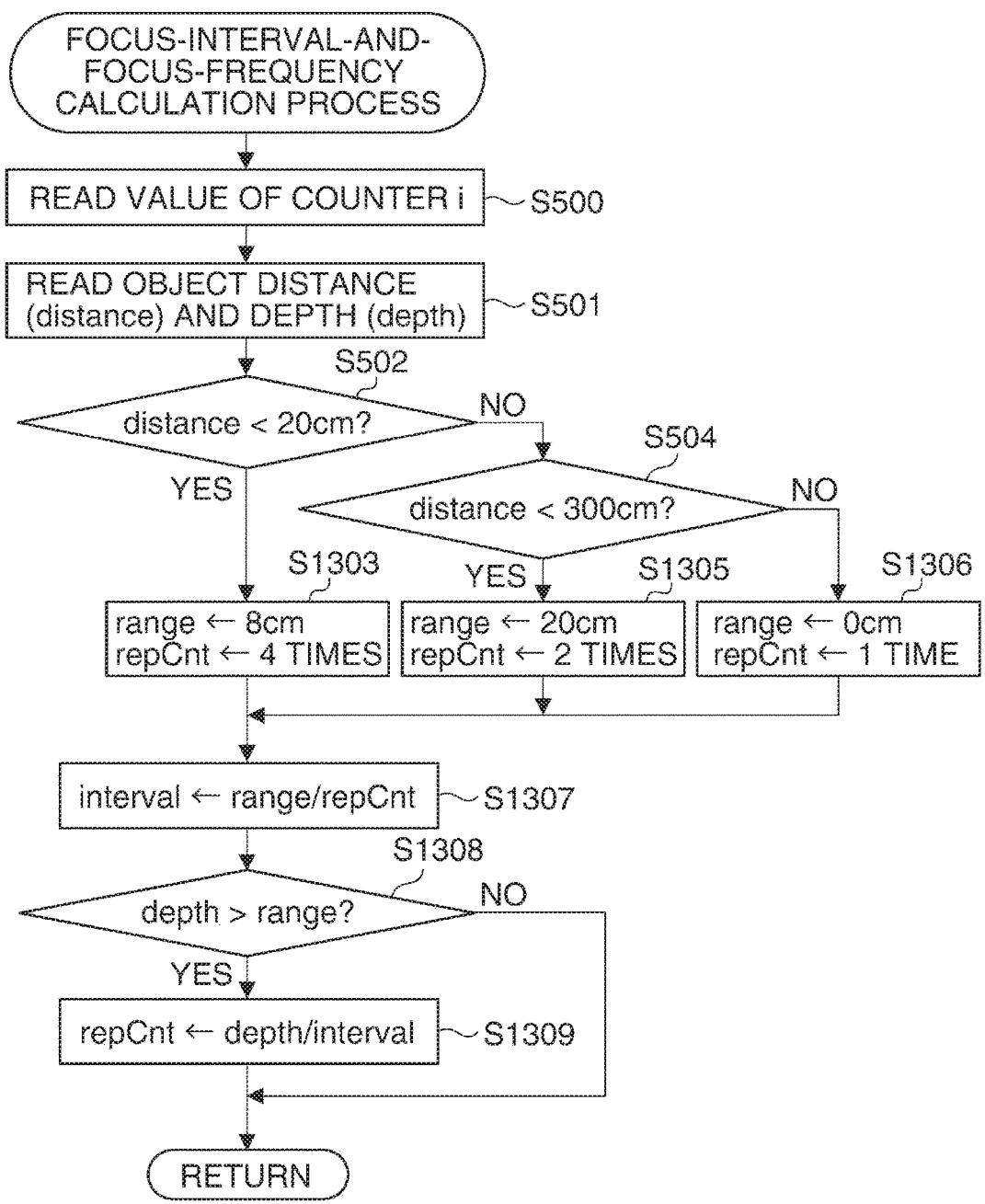
FIG. 13 is a flowchart showing another example of the focus-interval-and-focus-frequency calculation process shown in FIG. 2.

FIG. 13 is a flowchart showing another example of the focus-interval-and-focus-frequency calculation process shown in FIG. 2.

In the focus-interval-and-focus-frequency calculation process described in relation to FIG. 5, the focus interval and the focus frequency are changed according to the object distance. The focus range and the focus frequency in the focus range are changed according to the object distance in this example. It should be noted that the steps in FIG. 13 that are the same as the steps in FIG. 5 are labeled by the same reference numbers and the descriptions thereof are omitted.

When distance<20 cm (YES in the step S502), the CPU 101 determines that the distance to the object is in the near distance range, sets the focus range (range) to "8", and sets the focus frequency repCnt to "4" (step S1303). On the other hand, when distance≥20 cm (NO in the step S502), the CPU 101 determines whether the object distance (distance) is less than the predetermined second distance threshold in the step S504. When distance<300 cm (YES in the step S504), the CPU 101 determines that the distance to the object is in the middle distance range, sets the focus range (range) to "20", and sets the focus frequency repCnt to "2" (step S1305).

When distance≥300 cm (NO in the step S504), the CPU 101 determines that the distance to the object is in the far distance range, seta the focus range (range) to "0", and sets the focus frequency repCnt to "1" (step S1306).

After the step S1303, S1305, or S1306, the CPU 101 computes the focus interval (interval) according to the following formula (4) (step S1307).

$$interval=range/repCnt \quad (4)$$

Subsequently, the CPU 101 determines whether a relationship shown by the following formula (5) becomes true or false (step S1308).

$$depth>range \quad (5)$$

When the relationship shown by the formula (5) is true, i.e., holds (YES in the step S1308), the CPU 101 determines that the above-mentioned focus range (range) is short to obtain the necessary number of images for the depth of the target object, and calculates the focus frequency repCnt again according to the above-mentioned formula (2) (step S1309). Then, the CPU 101 finishes the focus-interval-and-focus-frequency calculation process.

On the other hand, when the relationship shown by the formula (5) is false, i.e., does not hold (NO in the step S1308), the CPU 101 determines that the above-mentioned focus range (range) is enough to obtain the necessary number of images for the depth of the target object, and finishes the focus-interval-and-focus-frequency calculation process.

When the focal plane distance calculation process described in FIG. 6 is performed after performing the processing described in FIG. 13, the focal plane distance described in FIG. 7 is computable, even if the focus range and the focus frequency in the focus range concerned is changed according to the object distance.

Although the threshold of 1000 cm is employed as an example in the image display process described in FIG. 12, the upper limit of the distance that can be expressed in the distance map may be employed as a threshold. For example, if the object distance cannot be computed correctly in a case where the object is distant by 300 cm or more, 300 cm is employed as the threshold. Moreover, if the object distance cannot be computed correctly in a case where the object is distant by 2000 cm or more, 2000 cm is employed as the threshold.

Although the threshold disTh is set to 1 cm in the object detection process described in FIG. 3, the threshold concerned may be changed according to the object distance. For example, when the object distance disClose is small (i.e., the object distance is short), the threshold also becomes small. On the other hand, when the object distance disClose is large (i.e., the object distance is long), the threshold also becomes large.

As a result of this, since an object close to the camera is detected in fine accuracy and a distant object is detected in coarse accuracy, the object detection process is performed in suitable accuracy.

Although the threshold objMinPix is set to 1/20 of the number of pixels that constitute the distance map in the object detection process described in FIG. 3, the above-mentioned threshold may be changed according to the object distances disClose and disFar. In this example, since an object becomes smaller as an object distance increases, the threshold is made smaller as an object becomes farther.

In the above-mentioned embodiment, when there is no image of which the in-focus position coincides with a user's designation at a time of reproducing an image, an image of which the focal plane distance is nearest to the searched distance is displayed. However, two images of which the focal plane distances are adjacent to each other may be composited. In such a case, the composite image is deteriorated as compared with an image focused at a time of photographing. However, since images are picked up at the suitable interval according to the object distance, the quality of the composite image is higher than that of a conventional technique.

Moreover, although 20 cm and 300 cm are used as the thresholds in the focus-interval-and-focus-frequency calculation process, the thresholds concerned may be variable according to an optical characteristic of the camera. Furthermore, the determinations are not limited by two times. The times of determinations may increase more than two. Moreover, the threshold may be changed so that the focus interval becomes finer and the focus frequency increases when the object distance becomes shorter and so that the focus interval becomes coarser and the focus frequency decreases when the object distance becomes longer.

Figures 14, 15:
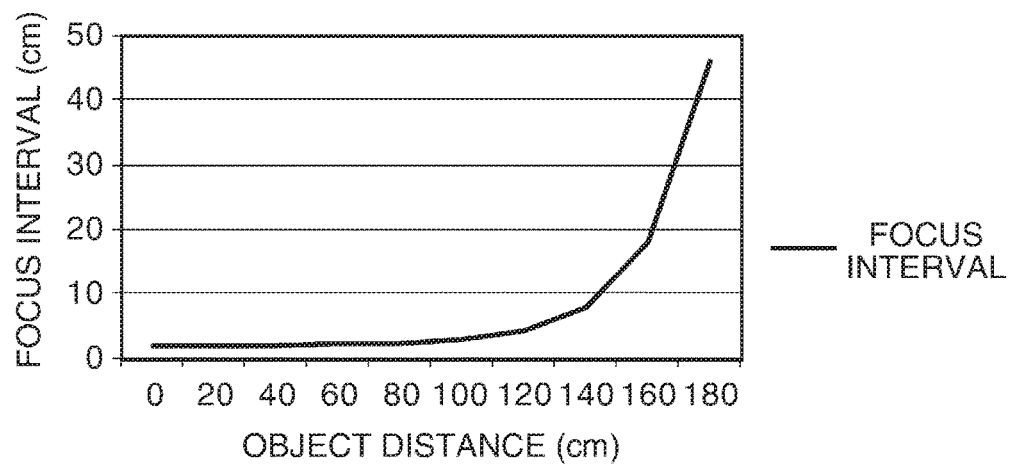
FIG. 14 is a graph showing an example of a relationship between the object distance and the focus interval used in the camera shown in FIG. 1.
FIG. 15 is a view showing an example of an object list to which a result (object characteristic information) of object detection performed with a camera according to a second embodiment of the present invention is registered.

FIG. 14 is a graph showing an example of a relationship between the object distance and the focus interval used in the camera shown in FIG. 1.

Although the use of the relationship shown in FIG. 14 changes the above-mentioned determination formula (1), it is enough to be able to determine whether the focus interval and the focus frequency that are computed are sufficient with respect to the depth of the object. Moreover, the focus frequency is determined so that it is sufficient to the depth of the object and so that photographing is possible at the focus interval and focus frequency corresponding to the object distance.

Thus, an object that is near a camera is photographed at a fine focus interval according to the first embodiment of the present invention. Accordingly, an image focused on a desired position of a near object is obtained. Furthermore, an object that is far from the camera is photographed at a coarse focus interval. This prevents useless photographing.

Moreover, since an object is not photographed again when the object distance is not changed or is changed less than a predetermined distance, useless photographing is prevented. Furthermore, since in-focus positions are set at regular intervals when an object has depth, an image that focuses on an intermediate position of an object with depth is obtained. Then, a high-quality image that focuses on a person or object that a user desires at a time of reproducing an image is obtained by performing necessary minimum focus bracket photography as mentioned above.

Next, a camera according to a second embodiment of the present invention will be described. Since the configuration of the camera of the second embodiment is the same as that of the camera shown in FIG. 1, the duplicated description is omitted.

The above-mentioned first embodiment describes the case where the focus interval is changed according to the object distance. On the other hand, the second embodiment will describe a case where the focus interval is changed according to the object distance and a characteristic of an object. It should be noted that the characteristic of an object mean whether an object is uneven and whether an object is a person or an animal, for example.

Moreover, the first embodiment uses the unique interval determined according to the object distance as the focus interval for each object. The second embodiment will describe a case where a coefficient for computing the focus interval is changed according to the object distance and the characteristic of the object.

A difference between the object distance of the boundary pixel and an object distance of an adjacent pixel is computed in the step S307 shown in FIG. 3. In a case where the object has little unevenness, the differences concerned incline toward a positive value, or incline toward a negative value. On the other hand, in a case where the object has much unevenness, the differences concerned take a positive value and a negative value alternately.

Consequently, a first totaling process that totals positive differences and a second totaling process that totals negative differences are added between the process in the step S307 and the process in the step S308 shown in FIG. 3. Furthermore, a process that totals the sum of the positive differences and the absolute value of the sum of the negative differences is performed between the process in the step S310 and the process in the step S311 shown in FIG. 3. Then, when the total led value is equal to or more than a predetermined threshold, the CPU 101 determines that the object is uneven, and registers the result into the object list stored in the RAM 103.

When determining whether an object is an animal as broad meaning including a person and an animal, a person detection process and an animal detection process that are known are used. For example, the CPU 101 determines whether the area surrounded by the boundary pixels including the boundary pixels coincides with the area that is defined by a person detection result or an animal detection result between the process in the step S307 and the process in the step S308 shown in FIG. 3. When the areas coincide, the CPU 101 determines that the object is a person or an animal, and registers the determination result concerned into the object list stored in the RAM 103.

FIG. 15 is a view showing an example of the object list to which a result (object characteristic information) of object detection performed with the camera according to the second embodiment of the present invention is registered. The components in FIG. 15 that are identical to the components of the example shown in FIG. 4 are labeled with the same reference numerals.

The object list shown in FIG. 15 has a person-or-animal column 1404 and an unevenness column 1405 in addition to the object number column 401, the distance (object distance) column 402, and the depth column 403. Then, when determining that the object is a person or an animal, the CPU 101 records a value of "TRUE" into the person-or-animal column 1404. Moreover, when determining that the object is not a person nor an animal, the CPU 101 records a value of "FALSE" into the person-or-animal column 1404.

Furthermore, when determining that the object is uneven, the CPU 101 records a value of "UNEVEN" into the unevenness column 1405. Then, when determining that the object is not uneven, the CPU 101 registers a value of "FLAT" into the unevenness column 1405.

Figure 16:
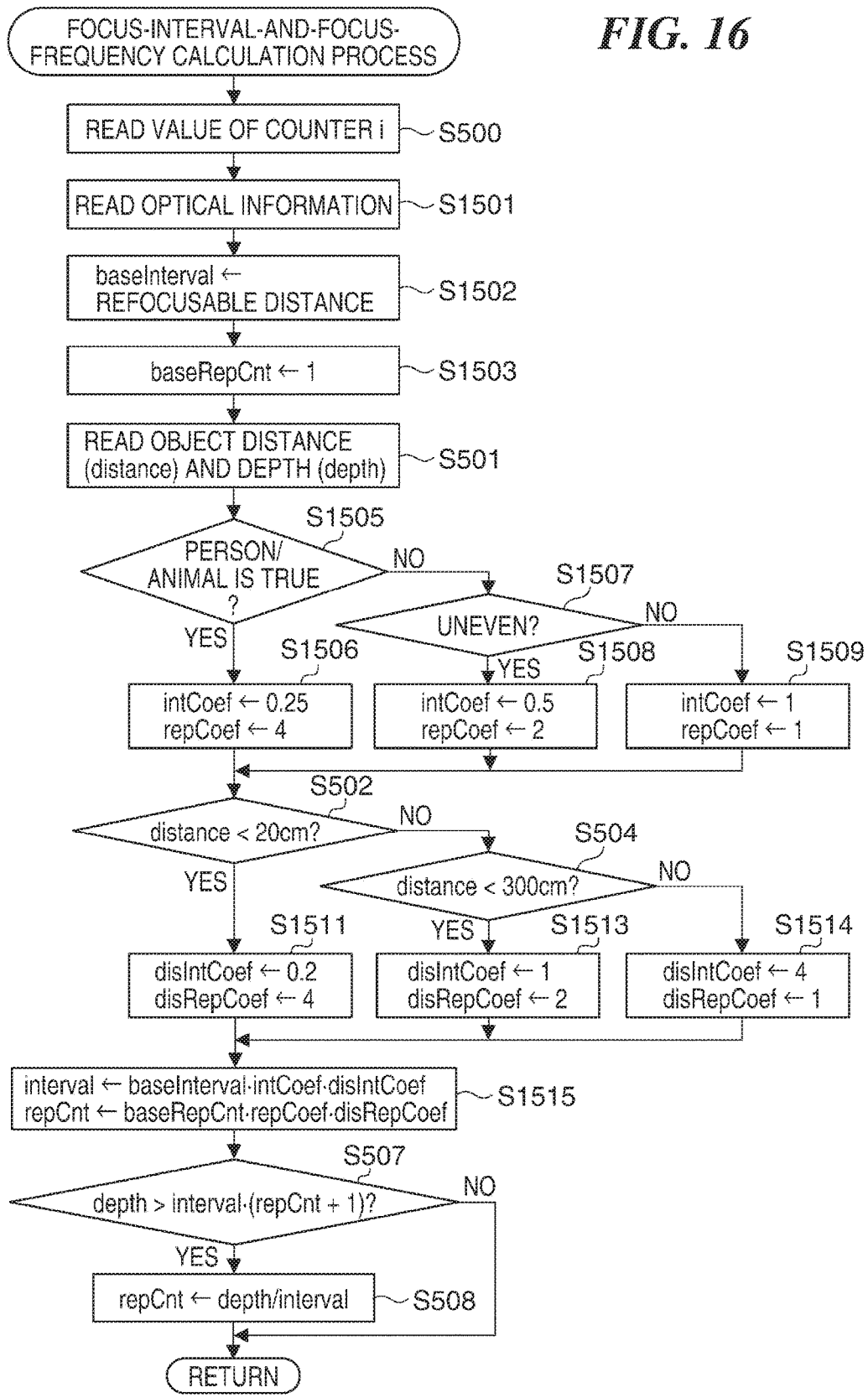
FIG. 16 is a flowchart showing a focus-interval-and-focus-frequency calculation process performed with the camera according to the second embodiment of the present invention.

FIG. 16 is a flowchart showing a focus-interval-and-focus-frequency calculation process performed with the camera according to a second embodiment of the present invention.

Hereinafter, a method that computes the focus interval and the focus frequency by changing coefficients according to the object distance and the object characteristic on the basis of the focus interval corresponding to the optical characteristic of the camera will be described. It should be noted that a step in FIG. 16 that is the same as a step in FIG. 5 is indicated by the same reference number and the description thereof is omitted.

After the process in the step S500 in FIG. 5, the CPU 101 reads optical information that shows an optical property of the camera beforehand stored in the ROM 102 (step S1501). Then, the CPU 101 obtains a distance that can be refocused (hereinafter referred to as a refocusable distance). The optical information is obtained by evaluating lens performance of the camera and performance of the image pickup device. The refocusable distance is computed according to the optical information.

Subsequently, the CPU 101 sets a standard focus interval baseInterval to the refocusable distance (step S1502). In this example, the refocusable distance shall be 20 cm. Then, the CPU 101 sets a standard focus frequency baseRepCnt to "1" as an initial value (step S1503).

Next, the CPU 101 reads the distance and depth concerning the i-th object from the object list shown in FIG. 15 in the step S501. Then, the CPU 101 determines whether the value in the person-or-animal column 1404 for the i-th object shown in FIG. 15 is "TRUE" (step S1505). When the value in the person-or-animal column 1404 is "TRUE" (YES in the step S1505), the CPU 101 determines that the object is a person or an animal, sets the object-characteristic-focus-interval coefficient intCoef to "0.25", and sets the object-characteristic-focus-frequency coefficient repCoef to "4" (step S1506).

When the value in the person-or-animal column 1404 is "FALSE" (NO in the step S1505), the CPU 101 determines that the object is not a person nor an animal, and determines whether the value in the unevenness column 1405 concerning the i-th object is "UNEVEN" (step S1507). When the value in the unevenness column 1405 is "UNEVEN" (YES in the step S1507), the CPU 101 determines that the object is uneven, sets the object-characteristic-focus-interval coefficient intCoef to "0.5", and sets the object-characteristic-focus-frequency coefficient repCoef to "2" (step S1508).

When the value in the unevenness column 1405 is "FLAT" (NO in the step S1507), the CPU 101 determines that the object is flat, sets the object-characteristic-focus-interval coefficient intCoef to "1", and sets the object-characteristic-focus-frequency coefficient repCoef to "1" (step S1509).

After the process in the step S1506, S1508, or S1509, the CPU 101 performs the process in the steps S502 described in FIG. 5. When the object distance (distance) is less than 20 cm (YES in the step S502), the CPU 101 sets the object-distance-focus-interval coefficient disIntCoef to "0.2", and sets the object-characteristic-focus-frequency coefficient disRepCoef to "4" (step S1511).

When the object distance (distance) is equal to or more than 20 cm (NO in the step S502), the CPU 101 performs the process in the step S504 described in FIG. 5. When the object distance (distance) is less than 300 cm (YES in the step S504), the CPU 101 sets the object-distance-focusinterval coefficient disIntCoef to "1", and sets the object-characteristic-focus-frequency coefficient disRepCoef to "2" (step S1513).

On the other hand, when the object distance (distance) is equal to or more than 300 cm (NO in the step S504), the CPU 101 sets the object-distance-focus-interval coefficient disIntCoef to "4", and sets the object-characteristic-focus-frequency coefficient disRepCoef to "1" (step S1514).

After the process in the step S1511, S1513, or S1514, the CPU 101 computes the focus interval (interval) and the focus frequency repCnt using a formula (6) and a formula (7), respectively (step S1515).

$$\text{interval} = \text{baseInterval} \cdot \text{intCoef} \cdot \text{disIntCoef} \quad (6)$$

$$\text{repCnt} = \text{baseRepCnt} \cdot \text{repCoef} \cdot \text{disRepCoef} \quad (7)$$

Subsequently, the CPU 101 determines whether the formula (1) holds in the step S507 described in FIG. 5. When the formula (1) holds, the CPU 101 performs the process in the step S508 and finishes the focus-interval-and-focus-frequency calculation process. On the other hand, when the formula (1) does not hold, the CPU 101 finishes the focus-interval-and-focus-frequency calculation process.

FIG. 17 is a view showing an example of a result of the focus-interval-and-focus-frequency calculation process performed with the camera according to the second embodiment of the present invention.

The example in FIG. 17 shows a case where the determination result in the step S507 shown in FIG. 16 is "FALSE" (i.e., a case where the focus interval and the focus frequency that are obtained by the process in the step S1515 are sufficient to obtain the necessary number of images with respect to the depth of the target object).

The calculation results of the focus interval and the focus frequency (hereinafter referred to as a focus result, simply) have an object characteristic registered in an object characteristic column 1601. This object characteristic is obtained according to the process in the steps S1505 and S1507 shown in FIG. 16. The object distance registered in the object distance column 1602 is obtained according to the process in the steps S502 and S504 shown in FIG. 16. The object-characteristic-focus-interval coefficient intCoef determined by the process in the steps S1506, S1508, and S1509 shown in FIG. 16 is registered into an object-characteristic-focus-interval coefficient column 1603.

The object-distance-focus-interval coefficient disIntCoef determined by the process in the steps S1511, S1513, and S1514 shown in FIG. 16 is registered into an object-distance-focus-interval coefficient column 1604. The object-characteristic-focus-frequency coefficient repCoef determined by the process in the steps S1506, S1508, and S1509 shown in FIG. 16 is registered into an object-characteristic-focus-frequency coefficient column 1605. The object-distance-focus-frequency coefficient disRepCoef determined by the process in the steps S1511, S1513, and S1514 shown in FIG. 16 is registered into an object-distance-focus-frequency coefficient column 1606.

The focus interval (interval) found by the process in the step S1515 shown in FIG. 16 is registered into a focus interval column 1607. Then, the focus frequency repCnt found by the process in the step S1515 shown in FIG. 16 is registered into a focus frequency column 1608.

It should be noted that the value "PERSON/ANIMAL" in the object characteristic column 1601 shows that an object is a person or an animal, and the value "UNEVEN" shows that an object has unevenness. Moreover, the value "NORMAL" shows that an object is not a person nor an animal, and is not uneven.

Moreover, although 20 cm and 300 cm are used as the thresholds in the focus-interval-and-focus-frequency calculation process shown in FIG. 16, the thresholds concerned may be variable according to the optical characteristic of the camera. Furthermore, the determinations are not limited by two times. The times of determinations may increase more than two. Moreover, the object-distance-focus-interval coefficient and the object-distance-focus-frequency coefficient may be linearly changed according to the object distance.

In such a case, although the above-mentioned determination formula (1) is changed, it is enough to be able to determine whether the focus interval and the focus frequency that are computed are sufficient with respect to the depth of the object. Moreover, the focus frequency is determined so that it is sufficient to the depth of the object and so that photographing is possible at the focus interval and focus frequency corresponding to the object distance.

Thus, the second embodiment of the present invention narrows the focus interval when the object that has complicated unevenness exists near the camera. Accordingly, when macro photographing of a flower, an insect, etc., is performed, an image at the in-focus position desired by a user is obtained.

Moreover, when an object is a person or an animal that is assumed as a target object, the focus interval becomes fine. As a result of this, when a person or an animal is photographed, an image at the in-focus position desired by a user is obtained.

Furthermore, since the focus interval is changed according to the characteristic of the optical system, useless photographing is prevented and necessary minimum photographing is managed. Then, a high-quality image that focuses on a person or object that a user desires at a time of reproducing an image is obtained by performing necessary minimum focus bracket photography (continuous photographing).

As is clear from the above description, the CPU 101 determines the focus interval and the focus frequency according to the object distance and predetermined conditions. The predetermined conditions include the object distance, the characteristic of the image pickup optical system, the characteristic of the object, etc. Moreover, the CPU 101 functions as the detection unit, the first computation unit, the decision unit, the second computation unit, the determination unit, and the control unit in the example shown in FIG. 1. Moreover, the CPU 101 and the image pickup unit 100 function as the photographing unit.

Although the embodiments of the present invention have been described, the present invention is not limited to the above-mentioned embodiments, the present invention includes various modifications as long as the concept of the invention is not deviated.

For example, the functions of the above mentioned embodiments may be achieved as a control method that is executed by an image pickup apparatus. Moreover, the functions of the above mentioned embodiments may be achieved as a control program that is executed by a computer with which the image pickup apparatus is provided. It should be noted that the control program is recorded into a computer-readable storage medium, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-087662, filed Apr. 22, 2015, which is hereby incorporated by reference herein in its entirety.

What is claimed is:

1. An image pickup apparatus comprising:
an age sensor configured to obtain a plurality of images;
at bast one memory configured to store instructions; and
at least one processor connected to the at least one memory and configured to execute the instructions to:
detect a plurality of objects from the plurality of images;
compute a distance between each of the plurality of objects and the image pickup apparatus as an object distance;
set a focus range according to the object distance of each object of the plurality of objects;
calculate a focus interval of in-focus positions for each set focus range; and
decide in-focus positions at which each of the plurality of objects is focused for focus bracket photography according to the object distance and calculated focus intervals,
wherein the in-focus positions are decided to be set at positions where the any one of the plurality of objects exist, and not to be set at positions where no object exists, and the focus interval of the in-focus positions for a first object of the plurality of objects is coarser than the focus interval of the in-focus positions for a second object of the plurality of objects, when an object distance of the first object is longer than an object distance of the second object.

2. The image pickup apparatus according to claim 1, wherein the focus positions are decided according to a characteristic of an image pickup optical system, through which the plurality of images are obtained.

3. The image pickup apparatus according to claim 1, wherein the at least one processor executes further instruction to determine an object characteristic, and
the focus positions e decided according to the object characteristic.

4. The image pickup apparatus according to claim 3, wherein the focus interval is finer when the object is determined to have predetermined unevenness as the object characteristic, than when the object is determined not to have the predetermined unevenness as the object characteristic.

5. The image pickup apparatus according to claim 3, wherein the at least one processor executes further instruction to set the focus intervals of one of the plurality of the objects to regular intervals when the object has depth exceeding a predetermined length as the object characteristic.

6. The image pickup apparatus according to claim 3, wherein the focus interval is finer when the object is determined as a person or an animal as the object characteristic, than when the object is not determined as a person or an animal as the object characteristic.

7. The image pickup apparatus according to claim 1, wherein the at least one processor executes further instruction to control said image sensor so as to photograph one of at least two of the plurality of objects, of which in-focus positions are identical, when the in-focus positions of the at least two of the plurality of objects decided are identical.

8. The image pickup apparatus according to claim 1, wherein the at least one processor executes further instruction to control said image sensor so as to photograph one of at least two of the plurality of objects, when difference between distances of in-focus positions of the at least two of plurality of objects decided by is less than a predetermined threshold.

9. The image pickup apparatus according to claim 1, wherein
the focus range includes a first focus range and a second focus range located in a farther side of a focus plane distance than the lint focus range.

10. The image pickup apparatus according to claim 9, wherein
the focus interval of the first focus range is smaller than the focus interval of the second focus range.

11. The image pickup apparatus according to claim 1, wherein
the focus interval is calculated based on a distance value of the focus range and a set focus frequency of the focus range.

12. The image pickup apparatus according to claim 1, wherein the focus interval within the same focus range is the same interval.

13. A control method for an image pickup apparatus comprising:
a detection step of detecting a plurality of objects from a plurality of images;
a first computation step of computing a distance between each of the plurality of objects and the image pickup apparatus as an object distance;
a setting step of setting a focus range according to the object distance of each object of the plurality of objects; and
a calculating step of calculating a focus interval of the in-focus positions for each focus range set in the setting step; and
a decision step of deciding in-focus positions at which each of the plurality of objects is focused for focus bracket photography according to the object distance and calculated focus intervals, wherein the in-focus positions are decided to be set at positions where the any one of the plurality of objects exist, and not to be set at positions where no object exists, and the focus interval of the in-focus positions for a first object of the plurality of objects is coarser than the focus interval of the in-focus positions for a second object of the plurality of objects, when an object distance of the first object is longer than an object distance or the second object.

14. A non-transitory compute readable storage medium storing a control program causing a computer to execute a control method for an image pickup apparatus, the control method comprising:

a detection step of detecting a plurality of objects from a plurality of images;

a first computation step of computing a distance between each of the plurality of objects and the image pickup apparatus as an object distance;

a setting step of setting a focus range according to the object distance of each object of the plurality of objects; and a calculating step of calculating a focus interval of the in-focus positions for each focus range set in the setting step; and a decision step of deciding in-focus positions at which each of the plurality of objects is focused for focus bracket photography according to the object distance and calculated focus intervals, wherein the in-focus positions are decided to be set at positions where the any one of the plurality of objects exist, and not to be set at positions where no object exists, and the focus interval of the in-focus positions for a first object of the plurality of objects is coarser than the focus interval of the in-focus positions for a second object of the plurality of objects, when an object distance of the first object is longer than an object distance of the second object.

* * * * *